(12) United States Patent
Volkov

(10) Patent No.: US 6,983,400 B2
(45) Date of Patent: Jan. 3, 2006

(54) DISTRIBUTED TEST HARNESS MODEL

(75) Inventor: Alexei Volkov, Mountain View, CA (US)

(73) Assignee: Sun Microsystems Inc., Santa Clara, CA (US)

( * ) Notice: Subject to any disclaimer, the term of this patent is extended or adjusted under 35 U.S.C. 154(b) by 490 days.

(21) Appl. No.: 10/147,945

(22) Filed: May 16, 2002

(65) Prior Publication Data

US 2003/0217308 A1    Nov. 20, 2003

(51) Int. Cl.
*G06F 11/00*    (2006.01)
(52) U.S. Cl. ........................................ 714/38
(58) Field of Classification Search .................... 714/38
See application file for complete search history.

(56) References Cited

U.S. PATENT DOCUMENTS 5,371,883 A * 12/1994 Gross et al. .................. 714/38
6,604,209 B1 * 8/2003 Grucci et al. .................. 714/38
2003/0120700 A1 * 6/2003 Boudnik et al. ............. 709/102
2003/0208528 A1 * 11/2003 Volkov et al. .............. 709/203

OTHER PUBLICATIONS

Testharness for use in a distributed environment, IBM technical Disclosure Bulletin, Dec. 1, 1999, UK.*
U.S. Appl. No. 09/953,223 entitled Distributed Processing Framework System by Avvari et al.

* cited by examiner

*Primary Examiner*—Robert Beausoliel
*Assistant Examiner*—Michael Maskulinski
(74) *Attorney, Agent, or Firm*—Martine Penilla & Gencarella, LLP

(57) ABSTRACT

A system and method for remotely testing an application includes providing a harness server and providing a first harness client. The first harness client is in communication with the harness server. Also a test script is provided to the harness server. A first application is executed by the first harness client and according to the test script. The first application outputs data to a central location. The output data can be monitored and the execution of first application controlled according to the output data.

17 Claims, 6 Drawing Sheets

DISTRIBUTED TEST HARNESS MODEL

CROSS REFERENCE TO RELATED APPLICATIONS

This application is related to U.S. patent application Ser. No. 09/953,223 filed on Sep. 11, 2001 and entitled "Distributed Processing Framework System," which is incorporated herein by reference in its entirety.

BACKGROUND OF THE INVENTION

1. Field of the Invention

This invention relates generally to distributed software execution, and more particularly to a remote execution model that provides remote application launch and control.

2. Description of the Related Art

Software is used to perform daily tasks at a rapidly increasing rate. New software is therefore being developed at an even more increasing rate. Assessing software reliability through software testing has therefore become an imperative stage in software development cycle. Software testing finds and eliminates defects (i.e., bugs) in software, which if undetected, can cause the software to operate improperly. In general, a stand-alone computer or a network of computer resources can be used to perform software testing. When a stand-alone computer system is used to perform the software testing, the computer system is programmed to run a test selected by the software user. When a network of computer resources is used, the user must manually add and delete the computer resources to the network, program the master computer system and the server, initiate the running of a user-selected test, and run the test on the group of dedicated computer systems coupled to the server. A distributed testing of this sort presents launch and control problems, as described next with reference to FIG. 1.

FIG. 1 is a block diagram showing a prior art distributed test configuration 100. The distributed test configuration 100 includes several test systems 102a–102c, each executing a test application 104a–104c. During launch and subsequent execution, the distributed test configuration 100 cannot provide any control related to the launch and execution. That is, the user cannot control the launch order and execution of the test applications 104a–104c using the prior art distributed test configuration 100. As a result, errors can occur when the test applications depend on each other for proper execution.

For example, during a particular test, test application B 104b may depend on an output from or other interaction with test application A 104a. In particular, test application A 104a may need to access test application B 104b to perform a particular test. However, the prior art distributed test configuration 100 generally launches all the application simultaneously, or close to simultaneously. If test system A 102a processes test application A 104a faster than test system B 102b processes test application B 104b, then test application A 104a may attempt to establish communication before test application B 104b is ready to establish or receive the communication. In such a situation, the communication attempt will fail, and as a result, the test will fail.

Failure can also occur when an application depends on the output of another application. For example, test application C 104c may depend on data that is output from test application A 104a for proper execution. If test application C 104c attempts to use the data output from test application A 104a before test application A 104a has generated the requested data, then application C 104c can fail the test.

In addition, the prior art distributed test configuration 100 cannot perform multiple tests because the distributed test configuration 100 cannot control or abort the test applications 104a–c that are being executed. The prior art distributed test configuration 100 also cannot perform multiple tests also because each test must be manually programmed into the test systems 102a–c.

In view of the foregoing, there is a need for a remote execution model for distributed application launch and control. The remote execution model should provide a mechanism for automated testing of multiple remote test applications. The remote execution model should also provide the facility for the test applications to interact and communicate and to provide control of the test applications.

SUMMARY OF THE INVENTION

Broadly speaking, the present invention fills these needs by providing a distributed test harness model. It should be appreciated that the present invention can be implemented in numerous ways, including as a process, an apparatus, a system, computer readable media, or a device. Several inventive embodiments of the present invention are described below.

In one embodiment a distributed test harness model includes a system and method for remotely testing an application includes providing a harness server and providing a first harness client. The first harness client is in communication with the harness server. Also a test script is provided to the harness server. A first application is executed by the first harness client and according to the test script. The first application outputs data to a central location. The output data can be monitored and the execution of first application controlled according to the output data.

In one embodiment, at least one of the harness client and the harness server can be launched by a distributed processing framework.

In one embodiment output data includes error data. The output data can also include a test log. The test log can include an interpreted test script. The interpreted test script can include the test results that can be interpreted without executing the first application.

In one embodiment, the test script includes one or more test configurations to be applied to the first application.

The first harness client and the first application can be on a first computer resource and the harness server can be on a second computer resource.

In one embodiment, the test script includes a deploy command that causes the first application to be deployed by the first client. Deploying the first application can include receiving one or more first application parameters in the harness server and determining if the first computing resource meets the first application parameters. If the first computing resource meets the first application parameters then the first computing resource is configured in accordance with the first application parameters and the first application is executed on the first computing resource. If the first computing resource does not meet the first application parameters then a fourth computing resource that meets the first application parameters can be selected with a distributed processing framework. A harness client can be launched on the fourth computing resource via the distributed processing framework. The successful launch of the harness client on the fourth computing resource is confirmed and the fourth computing resource is configured in accordance with the first application parameters. The first application can be launched on the fourth computing resource.

In one embodiment, the first harness client and the harness server are in communication via a computer network.

In one embodiment, the second computer resource also includes the central location.

One embodiment includes a second harness client on a third computer resource, the second harness client being in communication with the harness server. A second application is provided on the third computer resource. The second application is controlled according to the output data. The first application and the second application can be controlled substantially simultaneously. The first application can also depend on the second application. In one embodiment, the first application depends on the second application when the first application requires data that is received from central location which received the data from the second application.

In one embodiment controlling the execution of first application includes pausing the execution of the first application according to the test script. The first harness client can continue execution of the first application (i.e., unpause the execution) by posting a message from the harness server according to the test script and receiving the message in the first harness client.

In another embodiment a distributed test harness includes a harness server on a first computer, the harness server including a test script. A memory for storing data is also included. A distributed test harness also includes a first harness client on a second computer, the first harness client being in communication with the harness server. The first harness client for controlling execution of a first application on the second computer. The first application can output data to the memory. The first harness client controls execution of a first application on the second computer according to the test script and the data stored in the memory.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

Several exemplary embodiments of a distributed test harness model will now be described. It will be apparent to those skilled in the art that the present invention may be practiced without some or all of the specific details set forth herein. As mentioned above, embodiments of the present invention provide efficient control and execution of applications on remote resources using. In particular, a harness server can centrally control and coordinate several applications that are running on separate remote computing resources through a harness client on each of the remote computing resources.

The present invention provides the ability to remotely execute and control one or more applications on remote computer systems. This ability can be especially useful in testing software applications that must be compatible with numerous computer system types and configurations. Of course software testing is not the only use for remotely executing and controlling applications on remote computer systems.

Figure 1:
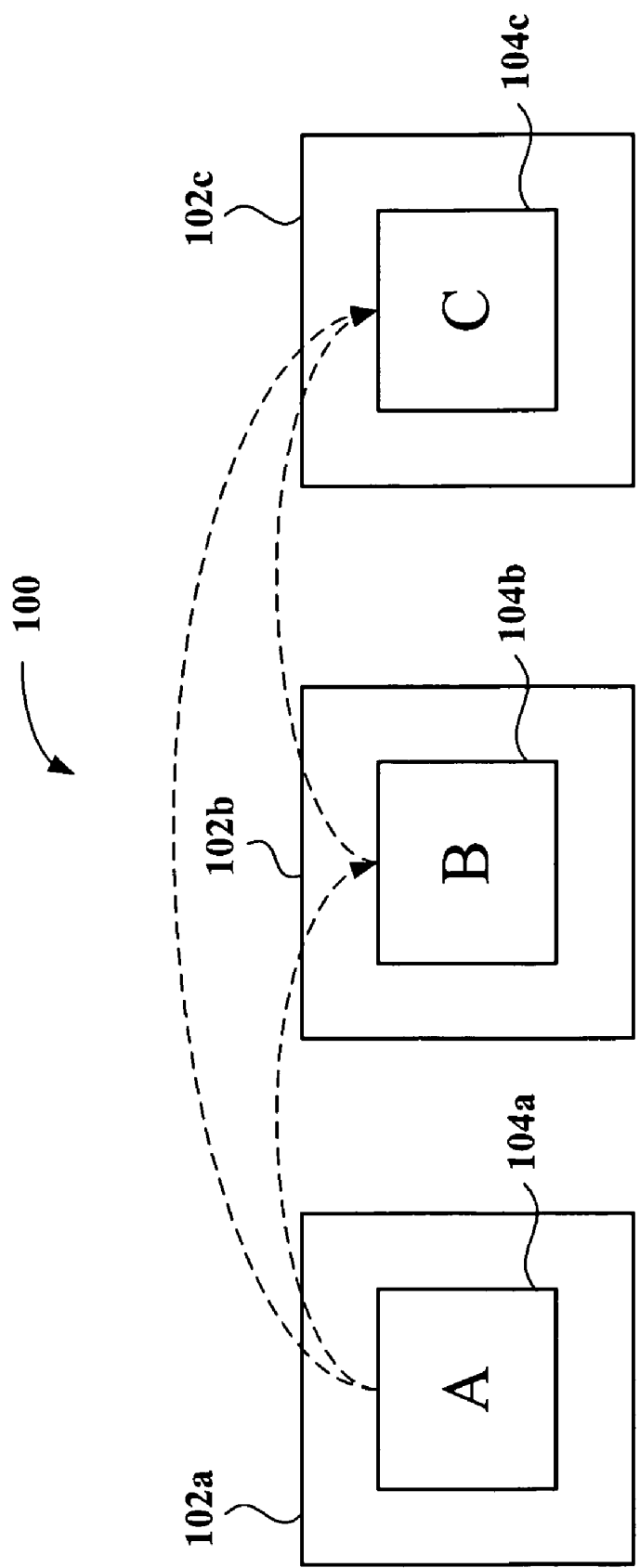
FIG. 1 is a block diagram showing a prior art distributed test configuration.
Figure 2A:
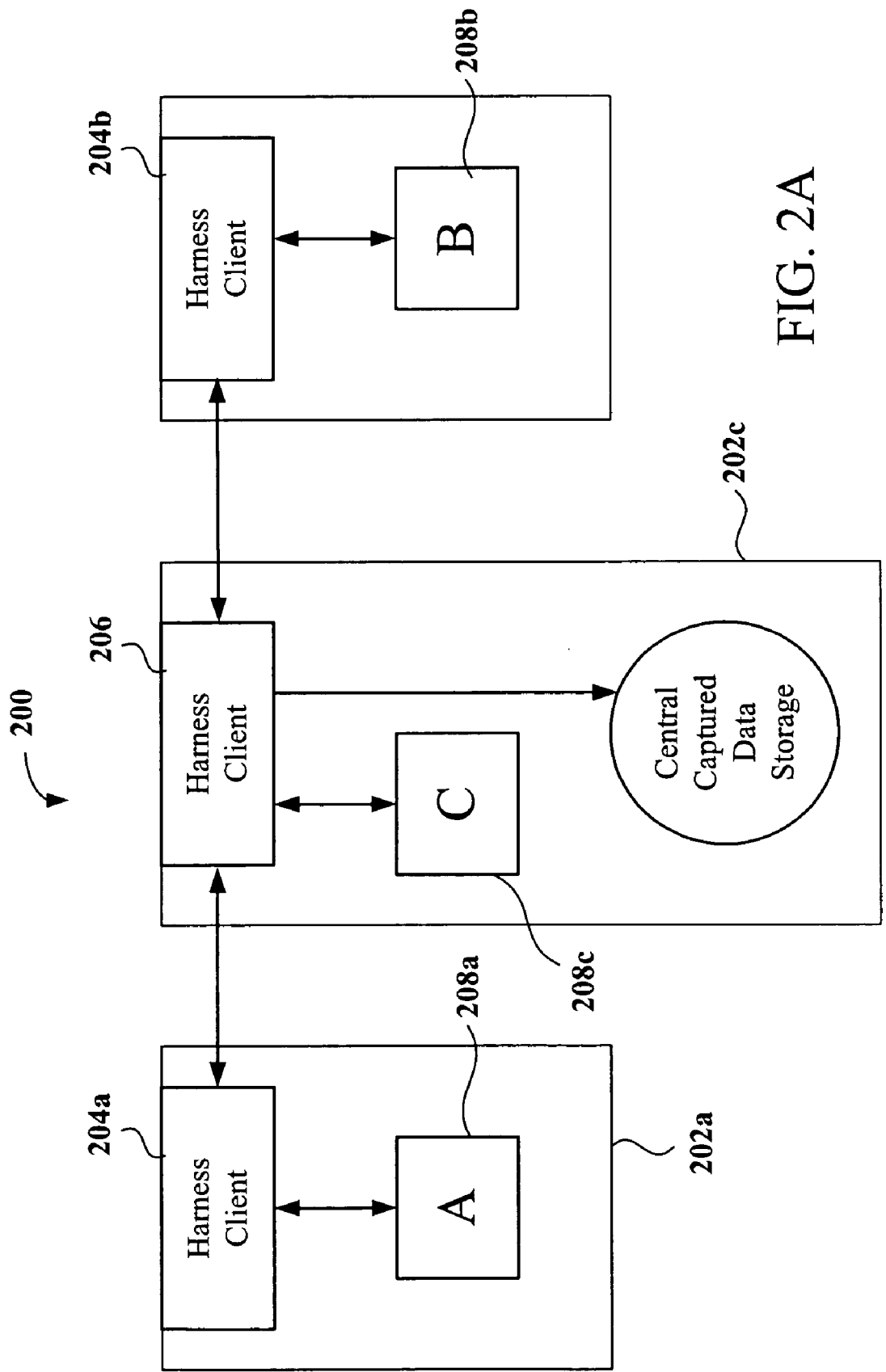
FIG. 2A is a block diagram showing a distributed harness system, in accordance with an embodiment of the present invention.

FIG. 2A is a block diagram showing a distributed harness system 200, in accordance with an embodiment of the present invention. The distributed harness system 200 includes several computer systems 202a–202c, each executing a portion of the distributed harness system 200. In the example of FIG. 2A, computer systems 202a and 202b each execute a harness client 204a and 204b. Computer system 202c executes a harness server 206, which is in communication with the two harness clients 204a–204b. Although the two harness clients 204a–204b are shown in FIG. 2A, it should be noted that any number of additional harness clients and applications can be included in at least one embodiment of the distributed harness system 200.

The exemplary distributed harness system 200 also includes several remote applications 208a–208c, each executing on the respective computer systems 202a–202c. Execution and launch control for the applications 208a–208c is provided by the harness server 206 and the harness clients 204a–204b. In particular, the harness server 206 provides overall control for the distributed harness system 200 by establishing communication with each harness client 204a–204b and providing control commands to each harness client 204a–204b. The harness server 206 can also include multiple applications and tests that can be automatically deployed to the test computer systems 202a–202c and which can be executed in a predetermined order on the computer systems 202a–202c.

In operation, the harness server 206 initializes itself by reading a configuration file that provides information concerning the particular distributed operating environment in which the distributed harness system 200 is operating. The configuration file includes information such as the particular applications to be launched, special control commands for the applications (e.g., coordinating parameters to coordinate multiple applications), and other information needed for proper execution of the distributed operating environment. After initialization, the harness server 206 listens for the harness clients 204a–204b included the distributed harness system 200.

Similar to the harness server 206, each harness client 204a–204b initializes itself using a client configuration file. Each client configuration file includes information needed by the particular harness client for initialization, such as the location of the harness server 206 and specific configuration parameters needed for a particular test. The harness clients 204a–204b also register with the harness server 206. The registration can include providing system specific information to the harness server 206, such as the computer system type and the operating system executing on the client computer system. The harness server 206 can then use this information to determine the types of operations that the client computer systems 208a–208b can perform.

Once the harness clients 204a–204b are initialized and registered with the harness server 206, the harness server 206 can begin to launch, monitor and control applications 208a–c on the client computer systems 202a–202b and on the server computer system 202c. Specifically, the harness server 206 processes a script file that defines what operations the harness server 206 should perform, and any parameters for the operations. These operations can include launching applications on both the client computer systems 202a–202b and on the server computer system 202c, and control commands for launched applications.

For example, in FIG. 2A, the harness server 206 receives a command to launch application A 208a, application B 208b, and application C 208c. The command further includes parameters defining on which computer system 202a–202c the applications 208a–208c should be launched. In response, the harness server 206 transmits a command to the harness client 204a to launch application A 208a. The harness server 206 also transmits a command to the harness client 204b to launch application B 208b. Further, the harness server 206 prepares to launch application C 208c on the server computer system 202c. Each harness client 204a–204b then launches the respective application 208a–208b on its computer system 202a–202b. In addition, the harness server 206 launches application C 208c on the server computer system 202c. The script that is processed by the harness server 206 can also define the order and timing of the above application launches.

In addition to launching applications in a controlled manner, embodiments of the present invention monitor the application execution and output to provide further execution control. In particular, each of the harness clients 204a–b and harness server 206 monitor the execution of and data output from the applications that the respective harness clients 204a–b and harness server 206 launches. For example, the harness client 204a monitors the execution and data output from application A 208a, the harness client 204b monitors the execution and data output from application B 208b, and the harness server 206 monitors the execution and data output from application C 208c.

This information is transmitted to the harness server 206, which can also monitor the information. For example, the harness client 204a provides the execution and output information of application A 208a to the harness server 206. In this manner, the harness server 206 can perform predefined operations based on the execution and output information from the various applications under the control of the harness server 206.

In addition to analyzing the monitored information, the harness server 206 can store the monitored information for each application in a central, captured data storage 210. In one embodiment, for each application 208a–208c, the central captured data storage 210 includes an application output file, an application error data file, and an application log file. The centrally stored application output file, application error data file and the application log file for each application under test can be used for post-test analysis of the data stored therein.

The application output file can store the data output generated by the respective application. The application error data file stores errors that occur during execution of the respective application, and the application log file stores a record of the execution of the application. For example, when the application is a test, the application log file stores a test log.

In one embodiment, the centrally stored application output file, application error data file and the application log file for each application under test are stored in a sub directory under directory where the application under test is stored. By way of example, if the application under test (i.e., application1) were located at the following example file location where the harness server is executing applications in a tcp suite:

<username>.<OS>.<arch>/tcp/application1

Where <OS> identifies the operating system (e.g., SunOS) and <arch> identifies architecture (e.g., sparc).

The application output file, application error data file and the application log file for application1 would be located in the following file respective locations:

```
<username>.<OS>.<arch>/tcp/application1/application1.out
<username>.<OS>.<arch>/tcp/application1/application1.err
<username>.<OS>.<arch>/tcp/application1/application1.tlog
```

Where application1.out includes the application output file and the application1.err includes the application error data file and the application1.tlog includes the application log.

Storing the application output file, application error data file and the application log file in subdirectories under the application under test allows multiple instances of the same application under test to be tested and the results stored separately. If the of an application were to be tested, each instance of the application could be differentiated by adding a number (e.g., "_1" for a first instance) to the application file name. For example, if two instances of application1 were tested, then the application and output files would be located in the following file locations:

```
<username>.<OS>.<arch>/tcp/application1_1
<username>.<OS>.<arch>/tcp/application1_1/application1_1.out
<username>.<OS>.<arch>/tcp/application1_1/application1_1.err
<username>.<OS>.<arch>/tcp/application1_1/application1_1.tlog
<username>.<OS>.<arch>/tcp/application1_2
<username>.<OS>.<arch>/tcp/application1_2/application1_2.out
<username>.<OS>.<arch>/tcp/application1_2/application1_2.err
<username>.<OS>.<arch>/tcp/application1_2/application1_2.tlog
```

In one embodiment, the script can also include a test list that identifies the tests to be run by the distributed harness system 200. For each test, the harness server 206 copies the data to a test work directory and executes the test. If there are application deployment instructions included in the test script, then the application can be deployed as described in FIG. 2B.

Figure 2B:
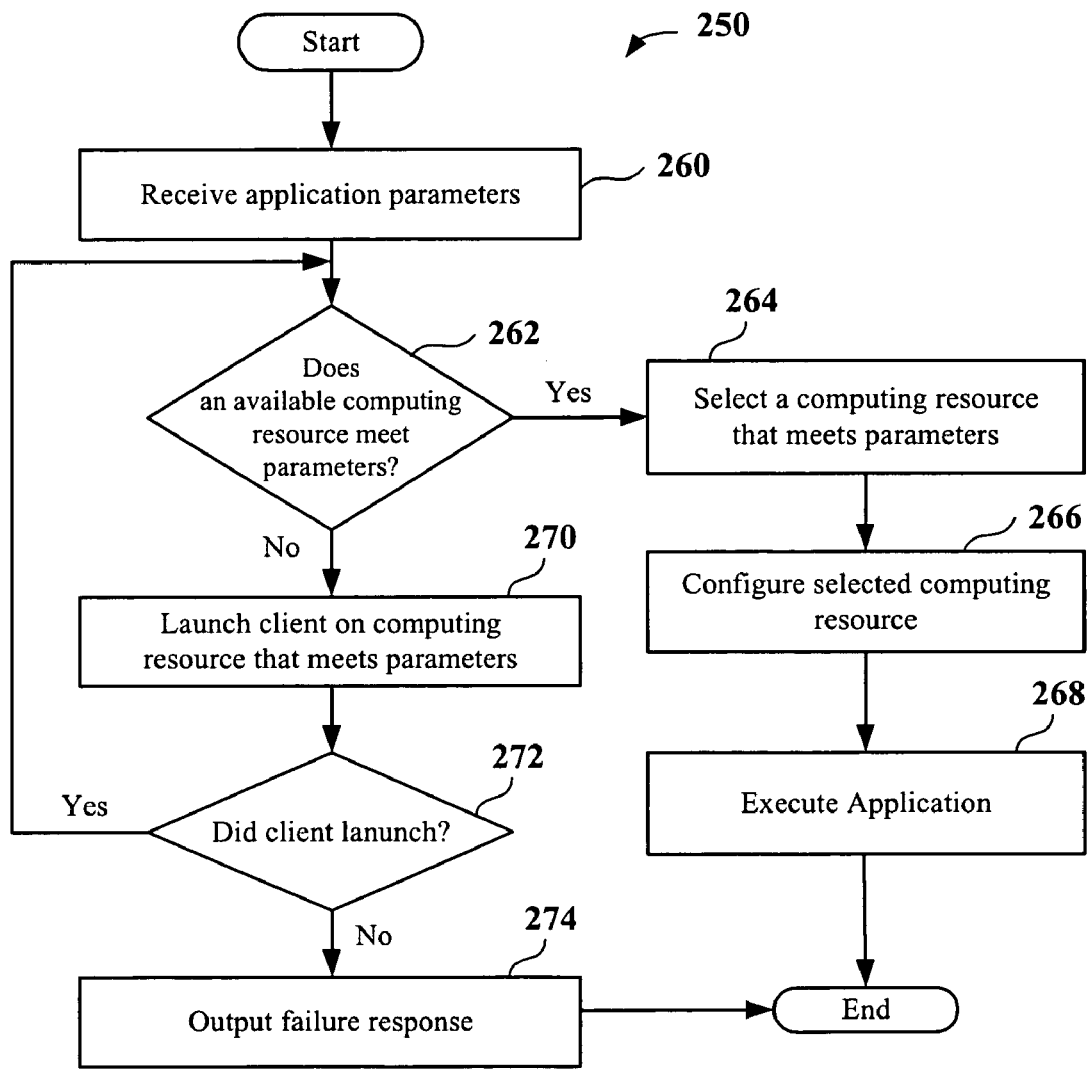
FIG. 2B is a flowchart diagram of the method operations of deploying an application, in accordance with one embodiment.

FIG. 2B is a flowchart diagram of the method operations of deploying an application 250, in accordance with one embodiment. In operation 260, the harness server 206 receives the application parameters for the application to be launched. The application parameters include the requirements of the application such as the type of the computing resource (e.g., operating system, processor type, hardware configuration, software configuration, etc.) required to execute the application. In operation 262 the available computer resources (e.g., computer systems 202a–202c with the harness clients 204a–b) are examined to determine if they meet the application parameters. For example, if the application parameters include an Intel x86 processor and the Linux operating system, and the computer system 202a is an Intel 486 processor with Linux operating system, then the computer system 202a meets the application parameters. If one of the available computer systems 202a–202c meets the application parameters then the operations continue in operation 264.

In operation 264, the computer resource that meets the application parameters (e.g., computer system 202a) is selected and configured in accordance with the application parameters in operation 266. For example, the application parameters may include the requirement that another application be running and available on the computer system 202a. Alternatively, the computer system may be busy executing an other application that is undesirable to execute on the same computer system as the application under test and the undesired application must be ended (e.g., aborted) or the execution of the application under test may be delayed until the undesired application has ended. In operation 268, the application is executed on the selected computer resource (e.g., computer system 202a) and the method operations for deploying the application under test end.

Returning to operation 262 above, if none of the available computer resources (e.g., computer systems 202a–202c) meet the application parameters, then in operation 270 a harness client is launched on fourth computer resource that does meet the application parameters. In operation 272, the launch of the harness client on the fourth computer resource is confirmed. If the harness client was successfully launched on the fourth computer resource, the method operations return to operation 262 described above. If the harness client was not successfully launched on the fourth computer resource, a test failure response is output to the harness server in operation 274 and the method operations end.

An example of a deploy statement for deploying an application such as application1 could include:

deploy application1 tcp_server

Which instructs the harness server to deploy an instance of the application tcp_server with the virtual name of application1. If the deploy statement deploys multiple instances of the application tcp_server, then a LOOPY symbol in an initialization file can be set with the value "1 2 3 4 5 6 7 8 9 10" and the deploy statement could use a loop function as follows:

```
for i in ${LOOPY}; do
    deploy tcp_client${i} tcp_client
done
```

The test script will deploy ten distinct instances of tcp_client identified as tcp_client1 through tcp_client10.

An application, that has been deployed on a computer running an instance of a harness client, can be controlled by the harness server through the test scripts. For example if the deployed application must finish before one of the steps of the application can be executed, then the test script can use a "wait completion" statement. The use of wait completion causes the script to wait for an application or for all applications that match a pattern. By way of example to wait for the harness server a script such as:

wait completion myserver

To wait for all of the clients to finish, an asterisk or other wild card can be used. For example the following statement can be used to cause the script to wait for all instances of the application tcp_client to finish before proceeding:

wait completion tcp_client*

Applications under test can also be synchronized by passing string values between a harness client and the harness server. An application can output an event and pass the event to the respective harness client that can send the event to the harness server. Scripts in the harness server can receive the events from the harness client. For example a test script can include a wait statement that is waiting for an event output from an application.

Similarly, an application can receive an event from a post statement in the harness server. The post statement is output from the harness server to a harness client. The harness client filters the post statement from the harness server to meet the input requirements of the application. In one embodiment an application that communicates with the harness server and harness client can be deployed with a "-sync flag argument. For example:

deploy tcp_server-virtual_name tcp_server-sysnc

The harness can pause (e.g., temporarily stop execution) or wait until the tcp_server instance has reached a point in execution where the tcp_server instance is ready to receive data from other applications. In one instance, the test script can be set to wait for a message from tcp_server before continuing to the method operations that deploy harness clients or before harness clients launch applications on the respective computer systems. In on embodiment, the tcp_server instance can send a "server-ready" string to the harness clients to indicate that tcp_server is ready to receive messages. Such a wait statement can use two arguments. The first argument is the application's virtual name and the second argument is the message string. For example:

wait tcp_server server_ready

The above statement will cause the application with the virtual name tcp_server to wait for the string "server_ready".

Sending a string to an application can be accomplished with a post statement. A post statement can take two arguments. The first argument is the virtual name of the application that is to receive the string and the second argument is the string. For example the following script will send the "server_ready" string to harness clients with virtual names tcp_client1, tcp_client2 . . . tcp client10:

```
for i in ${LOOPY}; do
    post tcp_clients${i} server_ready
done
```

A test list can include several tests to be executed on the applications under test. Unlike prior art distributed processing frameworks, the present invention can include multiple tests to be applied in succession on one or more applications under test. In one embodiment a test list contains two columns. The first column includes a test name and the second column contains a test type. The test name can include a directory name and the respective paths starting at the suite directory which will identify the location of the test. For example a test list of:

suite_dir/stuff/morestuff/test/test_dir dtonga

The above test list will list the sequence of tests that are scheduled for execution.

A test list can also include additional columns. A third column could be used to assign keyword lists to tests so that the test lists can be filtered. An example of a three column test list with a keyword list follows:

suite_dir/stuff/morestuff/test/test_dir dtonga 'compiler runtime'

The harness server can interpret script code between test list entries, therefore the tests can be assigned environmental and command line information in a reasonably direct manner. In the following example a test named test_dir is run twice, one time with JAVA_OTS set to -server and a second time with JAVA_OPTS set to -client. This is followed by the execution of a test named another_test. The test another_test can be run without any setting of JAVA_OPTS:

```
JAVA_OPTS=-server
suite_dir/stuff/morestuff/test/test_dir dtonga 'compiler runtime'
JAVA_OPTS=-client
suite_dir/stuff/morestuff/test/test_dir dtonga 'compiler runtime'
```

Output directories can be named using the end of the path in the test entry. Duplicates can be disambiguated by automatically appending a numerical suffix. Appending a numerical suffix can be inconvenient when using in-line scripting to pass an argument to a test so that the test will run different test cases because there is no clean way to map from test case to the different output directories. In one embodiment test.case.name is used to start the in-line script for a test case so as to prevent scripts that use in-line symbols to define test.case.name. The following example illustrates this principle:

```
test.case.name=test_dir_001
JAVA_OPTS=-server
suite_dir/stuff/morestuff/test/test_dir dtonga 'compiler runtime'
test.case.name=test_dir_002
JAVA_OPTS=-client
suite_dir/stuff/morestuff/test/test_dir dtonga 'compiler runtime'
```

In the above example output directories named test_dir_001 and test_dir_002 and another_test will be created. The test list entries can also be filtered using key words in the third column. The filter to apply can be defined by a command line argument pair. To illustrate: to run only those test list entries that include the keyword "compiler" could be started with a command line such as:

```
java harness-server \
    -port <server_port_number> \
    -inifile <server_ini_file> \
    -workdir <output_directory> \
    -filter compiler
```

More complex filters can also be built using Boolean logical operators. Parenthesis pairs can serve as grouping symbol. The following is an example of a more complex filter:

```
java harness-server \
    -port <server_port_number> \
```

```
    -inifile <server_ini_file> \
    -workdir <output_directory> \
    -filter runtime||compiler
```

The filter runtime||compiler defines a filter that will select test list entries that specify the runtime keyword, the compiler keyword, or both.

In addition to launching the distributed harness system 200 manually, as illustrated in FIG. 2A, the distributed harness system 200 can be launched in an automated manner, as described next with reference to FIGS. 3–5. In particular, a distributed harness system 200 of embodiments of the present invention can be launched using a distributed processing framework (DPF). In one example, the DPF system of the embodiments of the present invention implements the Jini™ (hereinafter "Jini") technology to provide spontaneous interaction between its components. In this manner, the computer systems attach to and detach from an ad-hoc network of processing resources (e.g., computer resources) without disturbing the DPF system. Accordingly, the computer resources are not limited to executing the distributed harness system of the embodiments of the present invention that is submitted to the DPF system.

DPF systems of the embodiments present invention can be distributed test framework (DTF) systems configured to manage test suite execution on cross-platform dynamically networked computer systems. In one implementation, the DTF system can include a server computer system and several ad-hoc network of processing resources configured to spontaneously interact implementing the Jini technology. The server computer system is configured to include a Jini look up service and a system controller configured to manage the processing of the submitted test suites. In one instance, the computer resources join the Jini look up service registering their respective proxies and the corresponding attributes. In one example, the system controller searches the look up service for an available suitable computer resource to process each of the submitted test suites. Once a computer resource is selected to run the test suite, the machine service component of the selected computer resource spawns a second service (e.g., process service) to execute the test suite.

As embodiments of the present invention can implement the Jini technology, a brief introduction to Jini is provided below. Nevertheless, this brief introduction to Jini should not be considered as limiting as Jini technology is well known by those skilled in the art. Jini technology is a network architecture that enables the spontaneous assembly and interaction of services and devices on a network of computer systems. Built on the Java platform, Jini technology eliminates the challenges of scale, component integration, and ad-hoc networking encountered in distributed computing environments. Jini simplifies interactions over a network by providing a fast and easy way for clients to use available services. Jini technology is also configured to be wire-protocol and transport-protocol neutral.

Summarily, Jini network technology includes a communication and programming model that enables clients and Jini services to discover and connect with each other to form an impromptu (i.e., spontaneous) Jini community. As Jini is written in Java, Jini implements the mechanism, Java Remote Method Invocation Application Program Interface (API), to move objects around the network.

In one embodiment, a Jini service is configured to employ a proxy to move around the network. As used herein, the proxy is defined as an object having service attributes and communication instructions. Through implementing discovery and join processes, the Jini services are found and thereafter registered with a look up service on a network. As used herein, registering a service is defined as sending the service proxy to all look up services on the network or a selected subset of the look up services. By way of example, the look up service is equivalent to a directory or an index of available services wherein the proxies for each of the services and their associated code are stored. When a service is requested, the proxy associated with the requested service is sent to the requesting client, thus enabling the client to use the requested service. Once dispatched, the proxy is configured to conduct all communication between the client and the Jini service.

In providing an ad-hoc network of computers, in one embodiment, Jini introduces a concept called "leasing." That is, once a service joins the Jini network, the Jini service registers its availability for a certain period of leased time. This lease period may be renegotiated before the lease time is expired. When a service leaves the Jini network, the service entry in the look up service is removed automatically once the service's lease is expired. For further details on Jini technology, please refer to K. Arnold et al., The Jini Specification (1999) and W. Keith Edwards, Core Jini (1999).

As Jini is implemented in the Java™ (hereinafter "Java") programming language, in a like manner, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code." The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Figure 3:
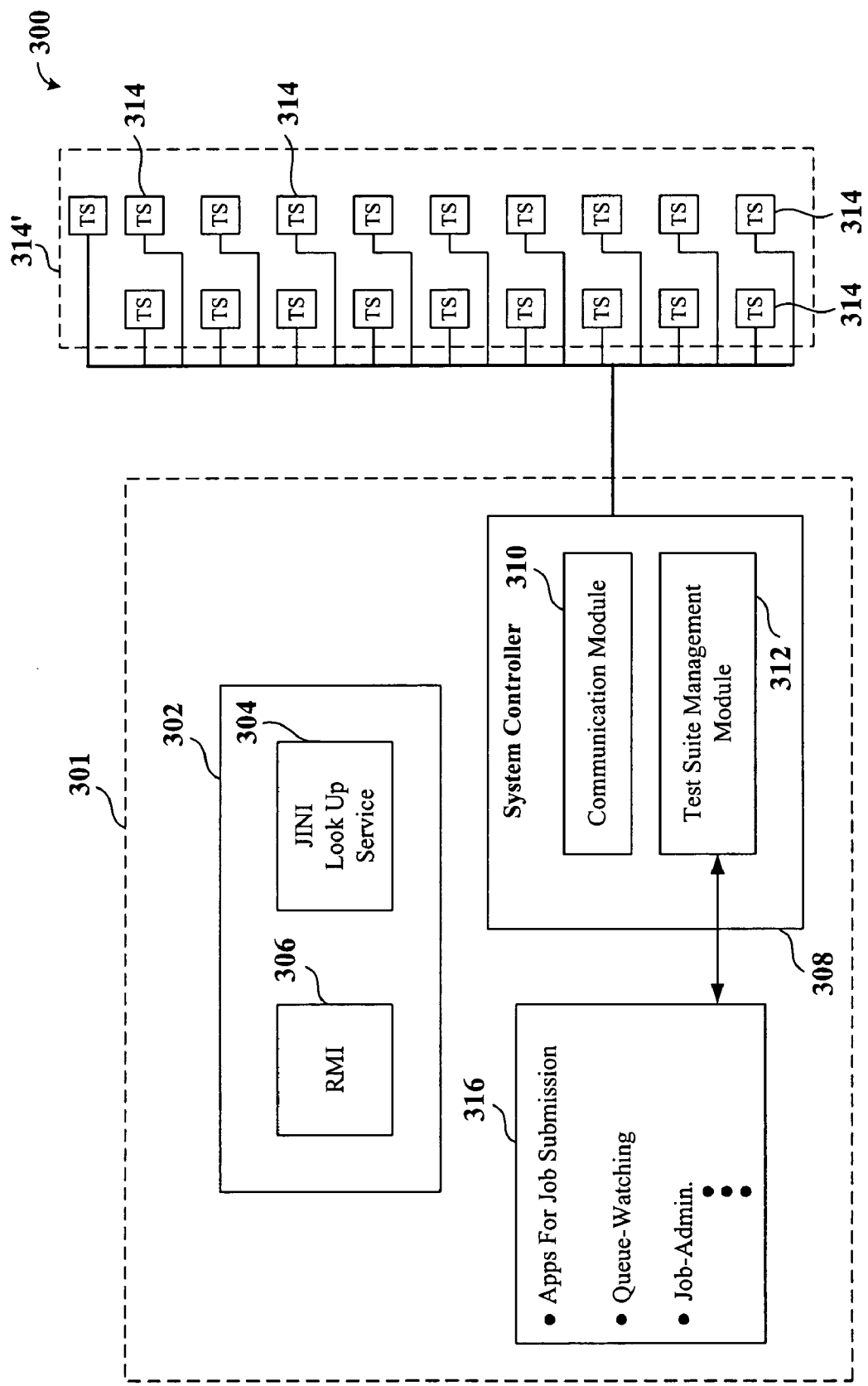
FIG. 3 illustrates a block diagram of a distributed test framework (DTF) system, in accordance with one embodiment of the present invention.

Keeping these brief overviews of Jini and Java as they relate to the embodiments of the present invention in mind, reference is now made to FIG. 3 illustrating a block diagram of a distributed test framework (DTF) system 300, in accordance with one embodiment of the present invention. As shown, physically, the DTF system 300 includes two groups of computer systems: (1) a system server group 301, and (2) a test system group 314'. The system server group 301 includes a service component 302 and a system controller 308. The service component 302 is configured to contain a Jini look up service 304 and a Remote Method Invocation (RMI) 306. In one embodiment, the RMI is designed to handle various communication needs. Comparatively, the Jini look up service 304 is a dedicated process running on the master computer system, server, and is configured to function as a central registry. As used herein, the master computer system is defined as the computer system running the system controller 308. As designed, in one embodiment, the master computer is configured to include both the system controller 308 and the service component 302. However, in a different implementation, each of the system controller 308 and the service component 302 may be included and run by separate computer systems. As designed, the look up service 304 is configured to enable the system controller 308 to locate available computer systems of an ad-hoc network of computer systems to execute a given test execution request using the test system registerable attributes. For instance, the look up service 304 includes registerable attributes, which identify the test machine platform, operating system, and other software and hardware characteristics.

The illustrated system controller 308 includes a communication module 310 and a test suite management module 312. The communication module 310 manages the communication between the system controller 308 and the distributed test systems 314. For instance, the communication module 310 is responsible for locating available test systems 314, running test execution requests, and gathering information regarding the status of the test systems 314. In one example, the system controller 308 manages the communication with the distributed test systems 314 by implementing multiple threads. In this manner, the system controller 308 has the capability to communicate with multiple test systems 314 in parallel. However, it should be noted that in other embodiments, the system controller 308 can implement any suitable mechanism to manage the communication between the system controller 308 and the distributed test systems 314 (e.g., Jini, RMI, TCP/IP Sockets, etc.).

The test suite management module 312 is responsible for managing the processing of the submitted test suites and the test execution requests. As used herein a test suite is a comprehensive list of data files having commands specifically programmed to initiate a number of functional aspects of the software product being tested. For instance, if the software product being tested is a word processing program, the test suite may activate a spell check command, a cut test command, a paste command, etc. Thus, once the test suite is executed, the test results reveal whether any of the tested commands failed to operate as intended. Also as used herein, once submitted for processing, each test suite becomes a "test execution request." As the processing of different portions of the test suite can be assigned to different test machines, the test suites may be divided into several test execution requests (i.e., jobs).

By way of example, the test suite management module 312 maintains an inqueue directory designed to include almost all the submitted test execution requests. Once the system controller 308 is initiated, the system controller 308 is configured to read each test execution request from files held in the inqueue directory. Once a test execution request is read, it is put into either a wait queue configured to hold test execution requests waiting to be executed or an execution queue designed to hold test execution requests currently being executed. Further information regarding managing the inqueue directory, wait queue, and execution queue will be provided below. As illustrated, in one example, the test suite management module 312 is configured to manage the software applications and user interfaces implemented for job submission, queue watching, job administration, etc., as shown in 316.

The test system group 314' includes multiple test systems 314 having similar or diverse hardware and software configuration. Although shown as a group, the test systems 314 are not necessarily limited to testing. In fact, the test systems 314 can be computers or systems used by employees of a company for normal desktop work. So long as the test systems 314 are associated with the networked group, the processing power of these test systems 314 can be used. In one embodiment, the test systems 314 can be used during normal working hours when the test systems 314 are running, for example, business applications, or during off hours, thus tapping into potentially huge processing resources that would otherwise be left unused. It should therefore be appreciated that test systems 314 do not necessarily have to be solely dedicated to testing or processing for the system server group 301.

In one embodiment, the test systems 314 are configured to execute the test execution requests dispatched by the system controller 308. Each of the test systems 314 runs an agent process (not shown in this Figure) designed to register the respective test system 314 with the Jini look up service 304. In this manner, the agent process for each test system 314 advertises the availability of the associated test system 314. As will be discussed in further detail below, a machine service component of the agent is used to establish communication between the associated test system 314 and the system controller 308. Specifically, by implementing the Jini attributes, the machine service registers the test system 314 characteristics with the Jini look up service 304. The test system 314 attributes are subsequently used by the system controller 308 to locate a test system 314 suitable to execute a specific test execution request.

While the DTF system 300 of the present invention can physically be divided into two groups, logically, the DTF system 300 of the embodiments of present invention comprises three over all components: (1) Job submission and other user interfaces; (2) Test scheduler and system controller; and (3) Test execution on remote or local systems.

For the most part, the job submission and other user interfaces component is a job queuing system having a variety of applications and user interfaces. As designed, the job submission component is configured to perform several tasks such as handling job submission, managing queues, administrating jobs, and administrating the ad-hoc network of the distributed test systems.

By way of example, in one implementation, the user interface may be as follows:

Launch system controller: In one embodiment, launching the system controller 108 is performed by running an appropriate shell script. As designed, the shell script is configured to launch the Jini and RMI support servers.

Kill system controller: Quit an appropriate shell script to destroy all the processes.

Submit jobs: Before the system controller 308 is launched, an Extensible Markup Language (XML) formatted test-execution-request file is created in the inqueue directory (e.g., that is preferably part of the test suite management module). In this manner, once the system Controller 308 is launched, the system controller 308 scans the inqueue directory, thus entering almost each and every test execution request into the in-queue (the in-queue being an actual queue, as contrasted with the inqueue directory).

Check queue: In one embodiment, a stopgap Graphical User Interface (GUI) is provided.

Cancel/administer a job: In one implementation, a stopgap GUI is implemented.

Other administrative tasks: In one exemplary embodiment, additional user interfaces are included. For instance, in certain cases, the system controller 308 is configured to implement various input files.

The second logical component, the test scheduler and system controller, includes the system controller 308 configured to perform the function of managing the job queues and dispatching the test execution requests to test system 314 for processing. Thus, the system controller 308 is configured to manage both; the wait queue (i.e., the queue containing the test execution requests waiting to be executed) and the execution queue (i.e., the queue containing test execution requests currently being executed). In one embodiment, the in-queue is analogous to the wait queue.

As designed, the test scheduler and system controller component is configured to include four modules:

Suite MGR: This module maintains a list of the available test suites stored in a known location in the file system. As designed, the test suite descriptions are stored in an XML formatted file in a suite directory.

Log MGR: This module is configured to handle the logging of activities inside the system controller 308 by implementing several log files having XML format. For instance, this is particularly useful for debug tracing and system statistics charting.

Queue MGR: This module is designed to maintain the two queues, wait queue (i.e., the in-queue) and the execution queue. Specifically, while a job is in any of the queues, an XML formatted file is kept in the queue directory reflecting the current status of the job. Each test execution request is configured to have a list of attributes describing the system characteristics required to execute the test execution request.

Scheduler: This module is configured to manage the dispatch of the test execution requests from the wait queue to the execution queue. In one embodiment, a job is dispatched when (a) the time to execute the job has been reached, and (b) a test system 314 having the required characteristics is available to execute the job.

Figure 4:
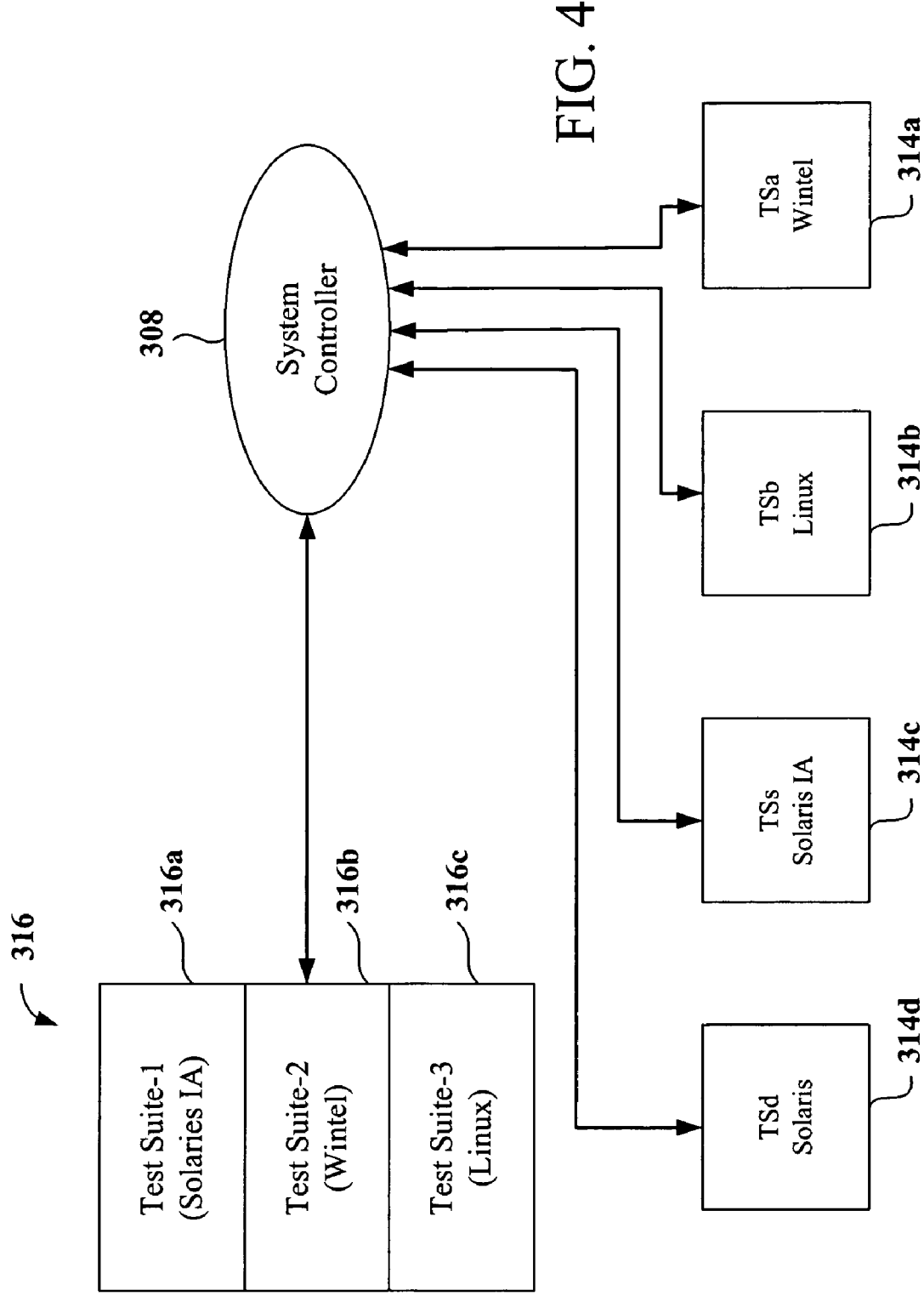
FIG. 4 illustrates the capability of the present invention to intelligently locate a test system available to execute a test suite, in accordance with one embodiment of the present invention

Reference is made to a block diagram depicted in FIG. 4 wherein the capability of the present invention to intelligently locate a test system 314 available to execute a test suite is illustrated, in accordance with one embodiment of the present invention. As shown, an inqueue directory 316 contains multiple test execution requests 316a, 316b, and 316c. In accordance with one embodiment of the present invention, once the system controller 308 is initiated, the system controller 308 is designed to read each test execution request 316a–316c contained within the inqueue directory 316. As shown, each test suite request 316a–316c must be executed by a test system 314 capable of running the test execution request requirements. For instance, each of the test execution requests 316a, 316b, and 316c must be run on a Solaris IA™ test system, a Wintel™ test system, or a Linux™ test system, respectively. The DTF system 300 of the present invention has the capability to advantageously locate an available test system from multiple ad-hoc network of test systems 314a, 314b, 314c, and 314d to execute each of the test execution requests 316a–316c.

As shown in the embodiment depicted in FIG. 4, each of the test systems 314a–314d has a different software and hardware configuration. For instance, while the test system 314a is run on Wintel™ and the test system 314b is run on Linux™, the test systems 314c and 314d are programmed to run on Solaris IA™ and Solaris™, respectively. As will be discussed in more detail below, the machine service for each test system 314a–314c registers the respective test system 314a–314c with the Jini look up service using the Jini attributes. Particularly, the embodiments of the present invention are configured to register the hardware and software configuration for each test system 314a–314d with the Jini look up service 304. In this manner, the system controller 308 can search the Jini look up service 304 implementing the test execution request requirements as search criteria. Thus, as shown in the example of FIG. 4, the system controller 308 of the present invention selects the test systems 314c, 314a, and 314b to execute the test suite requests 316a–316c, respectively.

Figure 5:
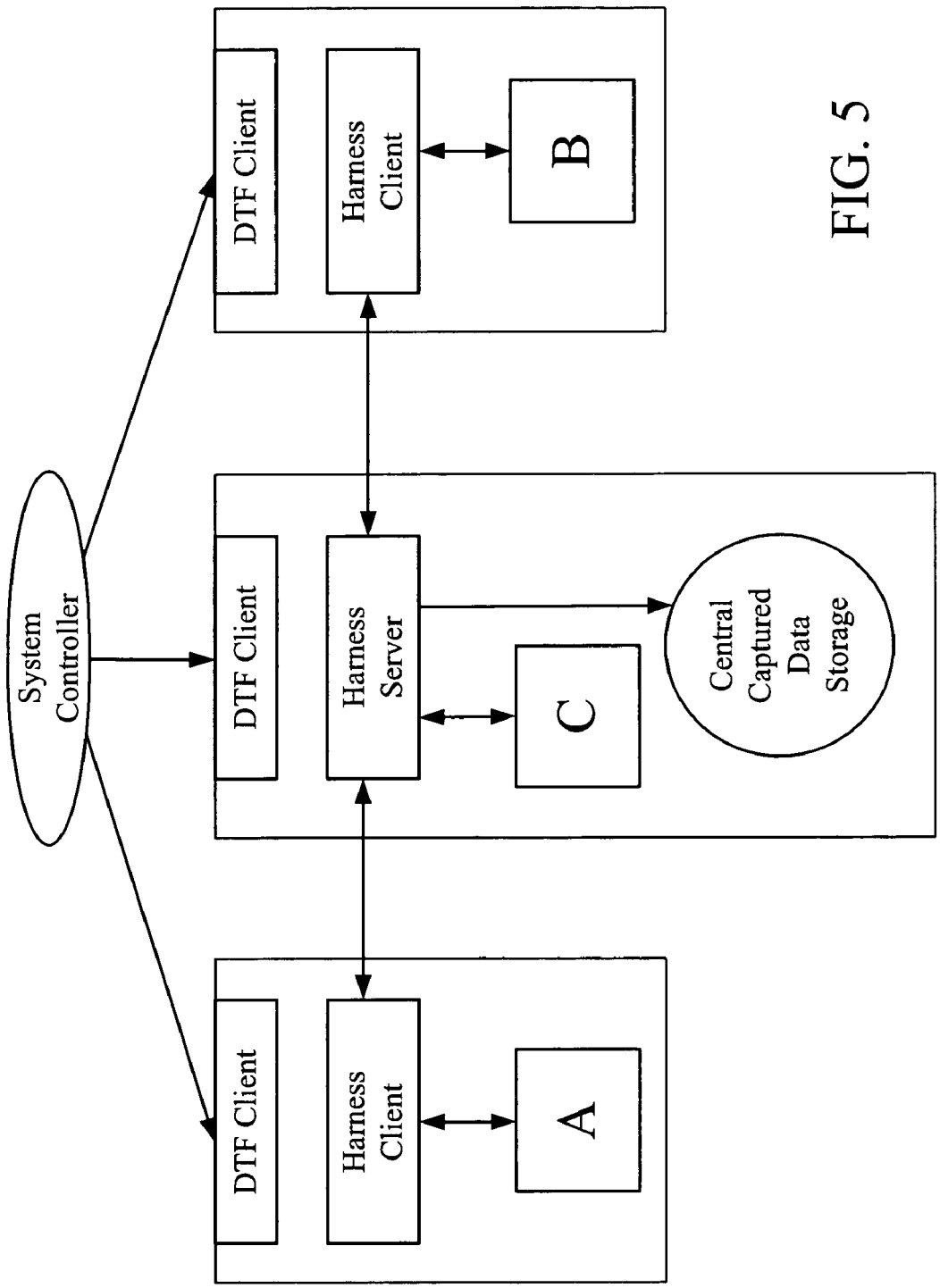
FIG. 5 is a block diagram showing a DTF launched distributed harness system, in accordance with an embodiment of the present invention.

FIG. 5 is a block diagram showing a DTF launched distributed harness system 500, in accordance with an embodiment of the present invention. The DTF launched distributed harness system 500 includes a system controller 308 in communication with several DTF clients 502a–502c, each executing on computer test systems 314a–314c. The system controller 308 can be used to automate launch of the distributed harness system 500 in a manner similar to the automated launch of test applications described above.

Specifically, the system controller 308 determines which computer systems are available to launch the harness server 206 based on the requirements of a particular test. Once appropriate computer system is found, the system controller 308 transmits a command to the DTF client 502c to launch the harness server 206. In response, the DTF client 502c launches the harness server 206, which initializes itself using a configuration file that provides information about the distributed operating environment. The configuration file also includes information regarding which harness clients are to be used for the test. Based on the configuration file, the harness server 206 requests the system controller 308 to launch the appropriate harness clients.

For example, in FIG. 5, the harness server 206 requests the system controller 308 to launch the harness clients 204a–204b. In response, the system controller 308 transmits a command to the DTF clients 502a and 502b to launch the harness clients 204a and 204b. Upon receiving the launch command from the system controller 308, each DTF client 502a–502b launches the appropriate harness client 204a–204b.

The harness server 206 then listens for the harness clients 204a–204b that comprise the distributed harness system 500. Each harness client 204a–204b also initializes itself using a client configuration file. Each client configuration file includes information needed by the particular harness client for initialization, such as the location of the harness server 206 and specific configuration parameters needed for a particular test. The harness clients 204a–204b then register with the harness server 206.

Once the harness clients 204a–204b are initialized and registered with the harness server 206, the harness server 206 can begin to launch and monitor applications on the test computer systems 314a–314c. Specifically, the harness server 206 processes a script file that defines what operations the harness server 206 should perform, and any parameters for the operations. These operations can include launching applications on both the test computer systems 314a–314c, and control operations for launched applications.

In addition to launching applications in a controlled manner, embodiments of the present invention monitor the application execution and output to provide further execution control. In particular, each harness module monitors the execution and output of the applications that the harness module launches. For example, the harness client 204a monitors the execution and output of application A 208a, the harness client 204b monitors the execution and output of application B 208b, and the harness server 206 monitors the execution and output of application C 208c.

This information is transmitted to the harness server 206, which analyzes the monitored information. In this manner, the test harness can perform predefined operations based on the execution and output information from the various applications under its control. In addition to analyzing the monitored information, the harness server 206 stores the monitored information for each application in a central captured data storage 210. For each application 208a–208c, the central captured data storage 210 includes an application output file, an application error data file, and an application log file.

Although the present invention mainly describes exemplary embodiments of a distributed test framework system designed to execute a test suite, it must be understood by one having ordinary skill in the art that the distributed processing framework of the present invention can be implemented to run any computer process. Additionally, although certain embodiments of the present invention are described based on the Jini technology, other network technologies having the capability to create an ad-hoc group of computer resources may be implemented (e.g., RMI, TCP/IP Sockets, etc.). Furthermore, although the present invention implements Java programming language, other programming languages may be used to implement the embodiments of the present invention (e.g., C, $C_{++}$, any object oriented programming language, etc.).

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data that can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in FIG. 2B are not required to be performed in the order illustrated, and that all the processing represented by the operations may not be necessary to practice the invention. Further, the operations described in FIG. 2B can also be implemented in software stored in any one of or combinations of the memory types in a standard or special purpose computer.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for remotely testing an application comprising:
    providing a harness server;
    providing a first harness client that is in communication with the harness server;
    providing a test script to the harness server;
    executing a first application, wherein the first harness client executes the first application according to the test script and wherein the first application outputs data to a central location, wherein the first harness client and the first application are on a first computer resource and the harness server is on a second computer resource;
    monitoring the output data;
    controlling the execution of first application according to the output data;
    providing a second harness client on a third computer resource, the second harness client being in communication with the harness server;
    providing a second application on the third computer resource; and
    controlling the second application according to the output data wherein the first application depends on the second application including the first application requires data that is received from central location which received the data from the second application.

2. The method of claim 1, wherein at least one of the harness client and the harness server are launched by a distributed processing framework.

3. The method of claim 1, wherein the output data includes error data.

4. The method of claim 1, wherein the test script includes one or more test configurations to be applied to the first application.

5. The method of claim 1, wherein the output data includes a test log.

6. The method of claim 5, wherein the test log includes an interpreted test script.

7. The method of claim 1, wherein the test script includes a deploy command that causes the first application to be deployed by the first client.

8. The method of claim 7, wherein deploying the first application includes:
    receiving a plurality of first application parameters in the harness server;
    determining if the first computing resource meets the plurality of first application parameters;
    if the first computing resource meets the plurality of first application parameters then:
        configuring the first computing resource in accordance with the plurality of first application parameters; and
        executing the first application on the first computing resource.

9. The method of claim 8, wherein if the first computing resource does not meet the plurality of first application parameters then:
    selecting a fourth computing resource that meets the plurality of first application parameters with a distributed processing framework;
    launching a harness client on the fourth computing resource via the distributed processing framework;
    confirming the harness client successfully launched on the fourth computing resource;
    configuring the fourth computing resource in accordance with the plurality of first application parameters; and
    executing the first application on the fourth computing resource.

10. The method of claim 1, wherein the first harness client and the harness server are in communication via a computer network.

11. The method of claim 1, wherein the second computer resource also includes the central location.

12. The method of claim 1, wherein the first application and the second application are controlled substantially simultaneously.

13. The method of claim 1, wherein controlling the execution of first application includes pausing the execution of the first application according to the test script.

14. The method of claim 13, further comprising:
    posting a message from the harness server according to the test script;
    receiving the message in the first harness client; and
    continuing the execution of the first application.

15. A distributed test harness comprising:
    a harness server on a first computer, the harness server including a test script;
    a memory for storing data;
    a first harness client on a second computer, the first harness client being in communication with the harness server and the first harness client for controlling execution of a first application on the second computer, wherein the first application capable of outputting data to the memory and wherein the first harness client capable of controlling execution of the first application on the second computer according to the test script and the data stored in the memory;
    a second harness client on a third computer, the second harness client being in communication with the harness server; and a second application on the third computer wherein the first application and the second application are controlled according to the output data wherein the first application depends on the second application including the first application requires data that is received from central location which received the data from the second application.

16. The system of claim 15, wherein the data stored in the memory includes error data.

17. The system of claim 15, wherein the data stored in the memory includes a test log.

* * * * *